A. P. KERN.
CHUCK.
APPLICATION FILED AUG. 3, 1908.
930,075.
Patented Aug. 3, 1909.
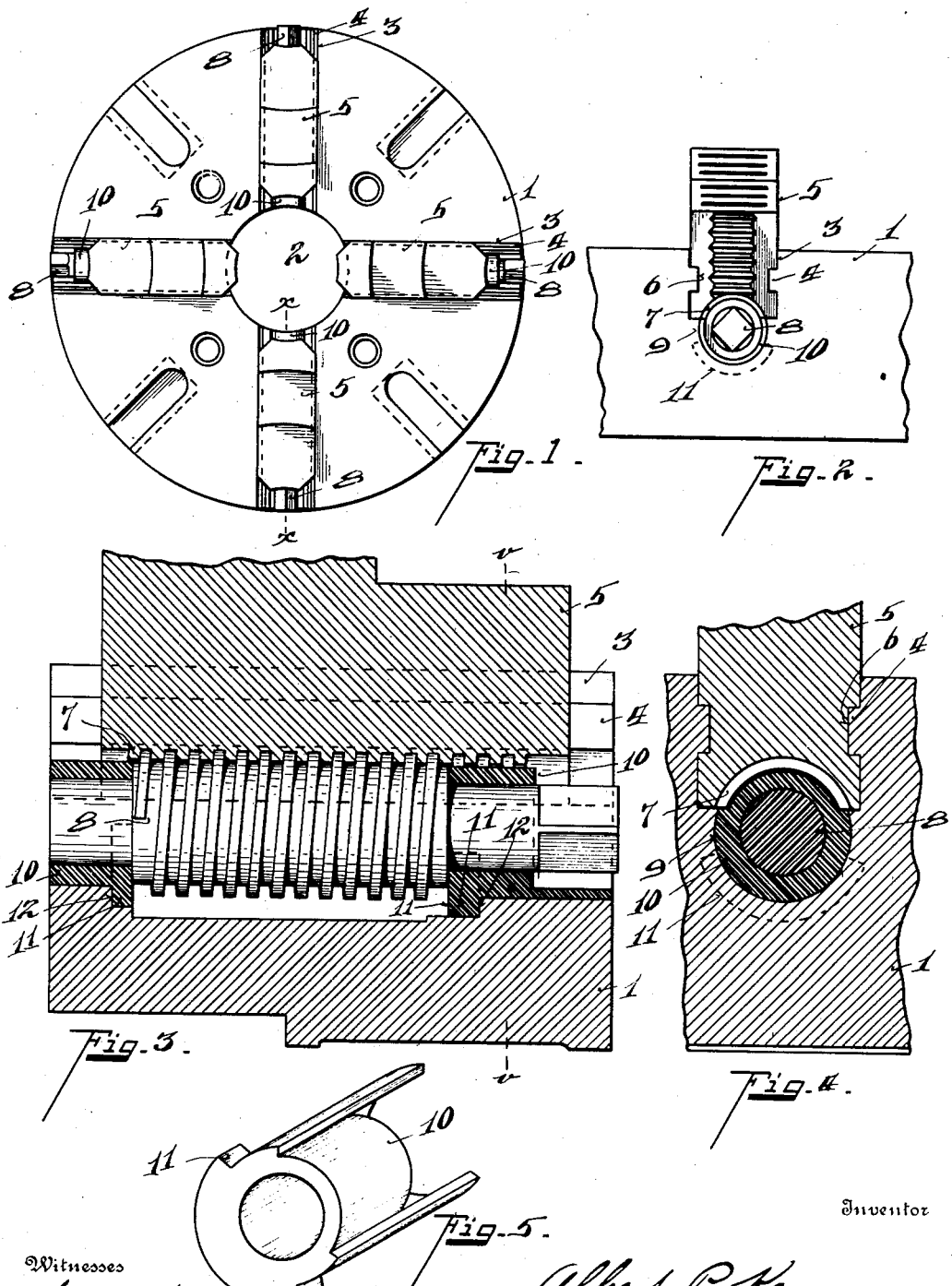

UNITED STATES PATENT OFFICE.

ALBERT P. KERN, OF CINCINNATI, OHIO, ASSIGNOR TO THE CINCINNATI CHUCK COMPANY, OF CINCINNATI, OHIO, A CORPORATION.

CHUCK.

No. 930,075.

Specification of Letters Patent.

Patented Aug. 3, 1909.

Application filed August 3, 1908. Serial No. 446,615.

*To all whom it may concern:*

Be it known that I, ALBERT P. KERN, a citizen of the United States, residing at Cincinnati, in the county of Hamilton and State of Ohio, have invented certain new and useful Improvements in Chucks, of which the following is a specification.

My invention relates to an improvement in chucks for machine tools.

The object of my invention is to provide an improved mounting for the radially adjustable jaws of a chuck.

The invention will be understood from the description of the figures shown in the accompanying drawings, forming a part of this specification, in which:—

Figure 1 is a plan view of the front face of the chuck. Fig. 2 is an end elevation of one of the jaws and a portion of the body. Fig. 3 is an enlarged section on line $x$, $x$, Fig. 1. Fig. 4 is a section on line $v$, $v$, Fig. 3. Fig. 5 is a perspective view of one of the bearing sleeves.

1 represents the body of usual construction and having the central axial orifice 2 for receiving the spindle.

3 represents the radial slots having gib-ways 4 for the sliding jaws.

5 represents the sliding jaws having gibs 6 radially adjustable in the slots and gib-ways of the chuck.

7 represents the half nut formed on the bottom of each sliding jaw for adjustment.

8 represents the operating screw engaging the half nut 7. I desire to provide a suitable bearing for the ends of this operating screw, and for this purpose I provide the bottoms of the radial slots 3 with radial orifices 9, forming in cross section the segment of a circle greater than a semi-circle in order to contain the bearing sleeve 10 and prevent displacement axially of the chuck. These sleeves 10 are of hardened steel and are endwise inserted into the orifice. There is a sleeve for the inner and outer ends of the orifices 9. Each sleeve has a flange 11 engaging against the shoulder 12 of the body to prevent the sleeve from being radially displaced in its orifice or seat. Preferably, the outer sleeve has a portion of its periphery cut away for providing clearance for the sliding jaw. The ends of the screws are thus given a hard steel bearing in the radial slot, so that the greatest possible efficiency may be derived.

Having described my invention, I claim:—

1. A chuck formed with a radial slot, a jaw having a sliding connection with the walls of the slot, an adjustable screw placed in the slot and engaging the jaw, and a hardened sleeve formed with a cutaway portion on its upper periphery, said sleeve being placed in the end of the slot and forming a bearing for one end of the screw, the cutaway portion of the sleeve being positioned to allow the jaw to move clear to the end of the slot.

2. A chuck formed with a radial slot, the bottom wall thereof being cut-away at one end to form a segmental orifice greater in cross-section than a semi-circle, and forming a shoulder at the inner end of the orifice, a jaw slidably engaging the walls of said slot, a screw in said slot engaging said jaw, a sleeve having a flange at the inner end, said sleeve being endwise removably inserted in said segmental orifice and forming a bearing for one end of said screw.

3. A chuck formed with a radial slot having an orifice at its outer end, greater in cross section than a semi-circle, there being a shoulder formed at the inner end of the orifice, a hardened sleeve bearing in said orifice formed with a flange at its inner end engaging said shoulder and having a portion of its upper periphery cut away, an adjusting screw in the slot having one end bearing in the sleeve, and a jaw slidably engaging the walls of the slot and adapted to move over the cut-away portion of the sleeve.

In testimony whereof, I have hereunto set my hand.

ALBERT P. KERN.

Witnesses:
OLIVER B. KAISER,
LOUISE BECK.